(12) United States Patent
Rumpler et al.

(10) Patent No.: US 7,823,810 B2
(45) Date of Patent: Nov. 2, 2010

(54) METHOD AND DEVICE FOR THE PRODUCTION AND/OR CONDITIONING OF POWDERED MATERIAL

(75) Inventors: Karlheinz Rumpler, Weimar (DE); Michael Jacob, Weimar (DE); Frank Ohlendorf, Kerspleben (DE); Bernhard Wand, Apolda (DE); Reinhard Bober, Weimar (DE)

(73) Assignee: Glatt Ingenieurtechnik GmbH, Weimar (DE)

( * ) Notice: Subject to any disclaimer, the term of this patent is extended or adjusted under 35 U.S.C. 154(b) by 183 days.

(21) Appl. No.: 12/299,620

(22) PCT Filed: Sep. 1, 2007

(86) PCT No.: PCT/EP2007/007647
§ 371 (c)(1),
(2), (4) Date: Nov. 5, 2008

(87) PCT Pub. No.: WO2008/061579
PCT Pub. Date: May 29, 2008

(65) Prior Publication Data
US 2009/0134250 A1      May 28, 2009

(30) Foreign Application Priority Data
Nov. 22, 2006   (DE) .................... 10 2006 054 930

(51) Int. Cl.
*B02C 19/00*    (2006.01)
(52) U.S. Cl. .............................. 241/5; 241/23; 241/29; 241/39; 241/65; 241/79; 241/80; 241/153
(58) Field of Classification Search .............. 241/5, 241/39, 80, 23, 79, 65, 29, 153, 179; 264/175, 264/41
See application file for complete search history.

(56) References Cited

U.S. PATENT DOCUMENTS

| | | | |
|---|---|---|---|
| 4,125,453 A | * | 11/1978 | Tamm et al. ................ 208/410 |
| 5,980,815 A | | 11/1999 | Matsunaga et al. |
| 6,187,238 B1 | | 2/2001 | Klatt et al. |

FOREIGN PATENT DOCUMENTS

| | | |
|---|---|---|
| DE | 224233 | 7/1985 |
| DE | 225630 | 8/1985 |
| DE | 272576 | 10/1989 |
| DE | 285724 | 1/1991 |
| DE | 296215 | 11/1991 |
| DE | 10303836 | 1/2004 |

* cited by examiner

*Primary Examiner*—Mark Rosenbaum
(74) *Attorney, Agent, or Firm*—Volpe and Koenig, P.C.

(57) ABSTRACT

A method and a device for producing and/or conditioning powdered material. The aim of the invention is to provide a method and an associated device which are used for producing and/or conditioning powdered material in a spouted bed comprising inert particles and in which a dry, fine powder having a very small particle diameter is produced at a low cost and at adequately large quantities in a continuous operation. This aim is achieved by a method in which the material is treated in several stages in a spouted bed comprising inert particles. In the method, the powdered material that is pre-processed in a first spouted bed and is separated from the larger material particles in an integrated dust collector is fed to a superimposed second spouted bed as a material-gas flow along with the gas flow discharged from the first spouted bed in order to be further reduced in size and be conditioned. After separating the fine particles from the larger material particles in a dust collector that is integrated into the second stage, the fine particles are discharged from the two-stage spouted bed treatment along with the gas flow as a powdered material having very small particle diameters. The separated larger material particles are once again fed to the second spouted bed of the second jet chamber. The device includes a spouted bed apparatus in which a jet chamber encompassing an integrated dust collector as well as a second superimposed jet chamber encompassing another integrated dust collector are disposed.

18 Claims, 3 Drawing Sheets

METHOD AND DEVICE FOR THE PRODUCTION AND/OR CONDITIONING OF POWDERED MATERIAL

BACKGROUND

The invention relates to a method for the production and/or conditioning of powdered material with the features mentioned in the preamble of claim 1 and the associated device having the features mentioned in the preamble of claim 9.

It is known to produce powdered material in a fluidized bed, in which a gas flow is supplied to maintain said fluidized bed. Here, the following types of operating a fluidized bed are known, which can be produced with the granulated or powdered material.

1. Spray Dryer

In a spray dryer, such as known from the patent publication DD 285 724 A5, a liquid containing solid materials is sprayed into the hot material-laden gas flow. Particles develop in the gas flow by way of drying, showing a hollow helical shape or fractions thereof. The material particles that develop have a relatively large grain size and usually show poor re-dispersing properties. A spray dryer according to the prior art is a very large and thus expensive apparatus, requiring a lot of space and large amounts of energy. Such spray dryers are not suitable to produce very small solid particles. An additional thermal conditioning of the particles produced in the spray dryer is impossible.

2. Fluidized Bed Arrangements with Inert Beds

Fluidized bed arrangements with inert beds, such as known from the U.S. Pat. No. 6,187,238, have a gas-permeable fluidized bed bottom. A fluidized material bed is formed by the gas supplied from the bottom via the fluidized bed bottom in which appropriate inert bodies are provided as well. However, no very fine particles with appropriately 100 μm can be produced here either, because the impulse acting on the inert particles is determined only by the predominantly vertical up and down motion of the inert particles in the given area of the fluidized bed, thus only between the fluidizing point and the discharge point and therefore it is insufficient for the requirement to produce fine particles from vaporized/evaporating liquids. In addition to drying the solid matter entrained in the introduced liquids on the surfaces of the inert bodies no additional thermal conditioning is possible in a fluidized bed stage.

3. Spray Towers with Fluidized Beds

Spray towers are known for example from the patent publication DD 272 576 A3, which are operated with a fluidized bed at their lower end. Here, the fluidized beds can be operated with or without any inert bodies. Here, thermal or mechanical post-conditioning by way of a respective abrasion of the particles falling from the spray tower is possible. It is disadvantageous here that during the thermal post-conditioning various gas flows are being mixed. In this combination the production of fine particles is also limited for the above-mentioned reasons.

4. Spouted Bed Arrangements

In an inert spouted bed stage the impulse potential to effect the inert particles is considerably greater than in a fluidized bed with equivalent inert bodies, because in the jet range the particle speed is considerably higher (e.g., 10 times higher) than the discharge speed of the particles and in spite thereof the particles are not removed due to the design typical for spouted bed arrangements. From the (patent publications DD 225 630 A1, DD 224 233 A1, DE 103 03 836 B4) spouted bed arrangements are known for the production of powdered material. Here, a gas flow is supplied from the bottom to the spouted bed arrangement at a high speed to create a vertically rotating spouted bed. A liquid containing solid matter is sprayed in, for example by one, two, or more spray nozzles from the bottom, the top, or the side of the jet chamber such that the liquid always wets the surfaces of the inert particles to the extent possible, i.e. that no overflow develops. The liquid containing solid matter, for example sediment, can also be added to the inert bed in motion via suitable conveyer devices, such as screws and/or slurry distributors, e.g., rotating wheels. Steel balls, ceramic balls, or Teflon particles having a suitable grain size, shape, surface condition, and density are used as inert particles provided in the spouted bed. The liquids are evaporated by the hot gas flow such that, on the one hand, dry material particles develop and material then develops on the inert particles, which adheres while drying. The material particles and the adhering dry solid matter is abraded by the inert particles moving in roller-shaped jets and are discharged from the jet chamber in the form of dust (e.g., <50 μm). The dust is usually removed as a product at one or more externally located, consecutively arranged different solid matter collectors of equal or different type (cyclones, filters.) Powdered products of increasingly smaller particle dimensions can be yielded, according to the capacity of the inert bed—spouted bed stage by the multiple consecutive arrangements of dust collectors downstream in reference to the spouted bed arrangement. It is disadvantageous that the desired small grain sizes are produced at minute amounts only. Additionally the consecutive arrangement of dust collectors is energy-consuming and thus expensive.

SUMMARY

The object of the invention is to provide a method and an associated device for producing and/or conditioning powdered material in a spouted bed with inert particles, in which a dry fine powder with very small particle diameters can be produced and/or conditioned cost-effectively and in appropriately large amounts in a continuous operation.

This object is attained according to the invention for the method by the characterizing features of claim 1 and for the device by the characterizing features of claim 9.

The method according to the invention is characterized in at least a two-step conditioning of the material in a spouted bed having inert particles. Here, the powdered material, pre-treated in a first spouted bed and separated from the coarser material particles in an integrated dust separating device, is fed by the gas flow leaving the first spouted bed as a material gas flow to a second spouted bed located thereabove for an additional milling and conditioning. After separating the fine particles from the coarser material particles in a second stage of the integrated dust collection device the fine particles are discharged together with the gas flow from the spouted bed treatment having two- or more stages in the form of a powdered material with very small particle diameters. The separated coarser material particles are resupplied to the spouted bed of the second spouted bed chamber.

The device according to the invention comprises a spouted bed arrangement, in which a first spouted bed chamber is provided, having an integrated dust collection device and a second spouted bed chamber is located thereabove having another integrated dust collection device.

By the arrangement of heating and/or cooling devices and/or the supply of liquids or liquids containing solid matter the material to be produced can additionally be thermally treated and conditioned in a defined manner, such as polymerized, solidified, or coated.

The advantage of the method according to the invention and the device comprises that in a continuous process a homogenous, fine powdered product having a very small particle diameter is produced effectively. Additionally the material to be produced can be treated (conditioned) in the spouted bed in a thermally gentle fashion, if necessary, in order to thus yield a powder with properties of known and also novel product morphologies.

Another advantage is the fact that the production of the powdered material with very small particle diameters is performed in a single device, so that no additional external heat producers, mills, or sieves are necessary any more. Only a commercially available, powerful fan is necessary in the pressure and or suction operation, or a combination thereof, in order to overcome the initial loss in pressure of the spouted bed, in order to then allow a continued production in the operational state with the loss of spouted bed pressure known to be much lower.

Additional advantageous embodiments are described in the dependent claims; they are explained together with their effectiveness in the description.

BRIEF DESCRIPTION OF THE DRAWINGS

In the following an exemplary embodiment is explained in greater detail. In the respective drawings, shown are.

DETAILED DESCRIPTION OF THE PREFERRED EMBODIMENTS

Figure 1:
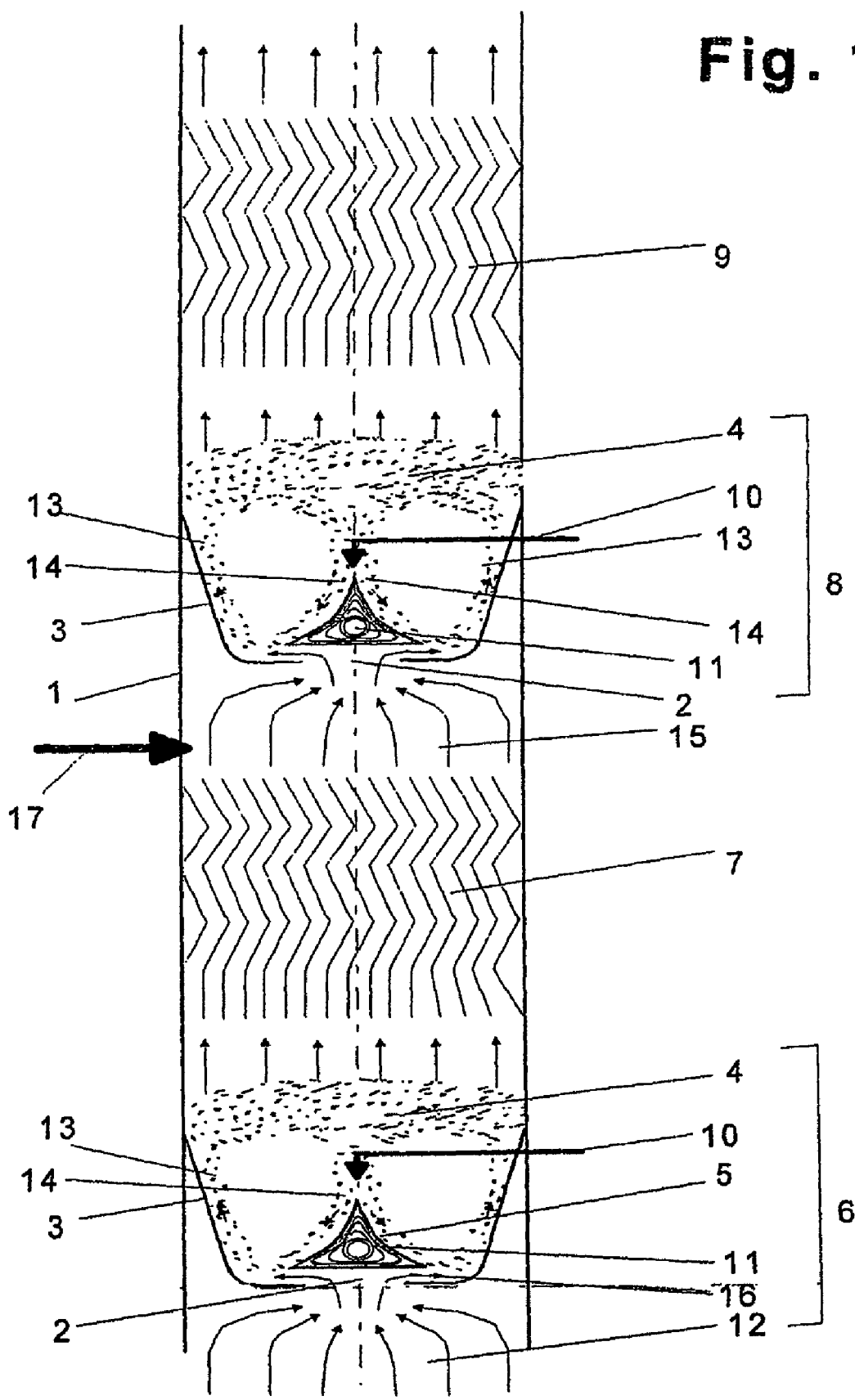
FIG. 1 is a spouted bed arrangement according to the invention in a cross-section.
Figure 2:
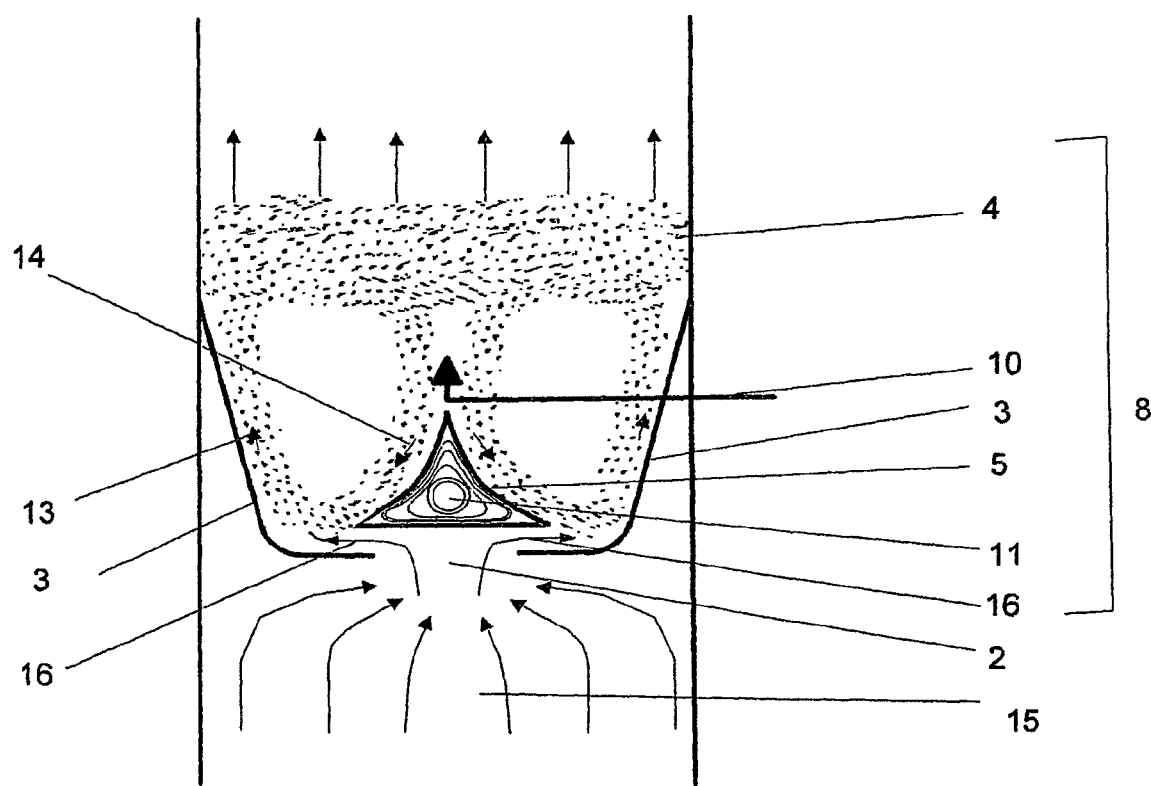
FIG. 2 is a detail of the spouted bed arrangement in a cross section, and FIG. 3 are embodiments of an installation part in the spouted bed arrangement in a cross-section.

FIG. 1 shows a spouted bed device 1 according to the invention, which preferably has a cross-section bilaterally symmetrical. It is also possible to embody the spouted bed device 1 with a round cross-section. The spouted bed device 1 comprises a first jet chamber 6 with an integrated dust collection device 7 and a second jet chamber 8 located thereabove having an integrated dust collection device 9. Nozzles 10 for liquids or liquids containing solid matter, such as suspensions, solutions, melts, or slurries, are arranged in the jet chamber 6 and/or the jet chamber 8. A separator, not shown, for a final collection of the target product with a uniform size is arranged downstream in reference to the spouted bed device 1.

The dust separating devices 7 and/or 9 arranged above the jet chamber 6 and/or 8 represent a zigzag-sifter, for example. The dust separating devices 7 and 9 can also be formed by an expansion of the cross-section of the exterior walls of the spouted bed device 1. The dust separating device 9 has a higher collection ratio than the dust separating device 7 so that only material having the desired particle size is removed from the spouted bed device 1 via the dust separating device 9.

In their lower area the jet chambers 6 and 8 are provided with an almost centrally arranged opening 2. The opening 2 opens into a channel 16, pointing at both sides in the direction of the side walls 3. The side walls 3 are here inclined outwardly in reference to the vertical and straight or provided with an interior curve. A wedge-shaped installation part 5 is arranged above the opening 2 of the jet chambers 6 and 8. Here, the lower walls of the installation part 5 each form a side wall of the channel 16. The installation part 5 located in the jet chambers 6 and 8 is embodied hollow, with a controllable heating device 11, for example high-frequency heating elements, can be arranged in the installation part 5 embodied hollow for the thermal conditioning of the material. The side walls of the wedge-shaped installation part 5 show a straight or inwardly curved contour, with the angle A between the side walls and the base area of the installation part 5 ranging from approx. 45° to 60°.

Figure 3:
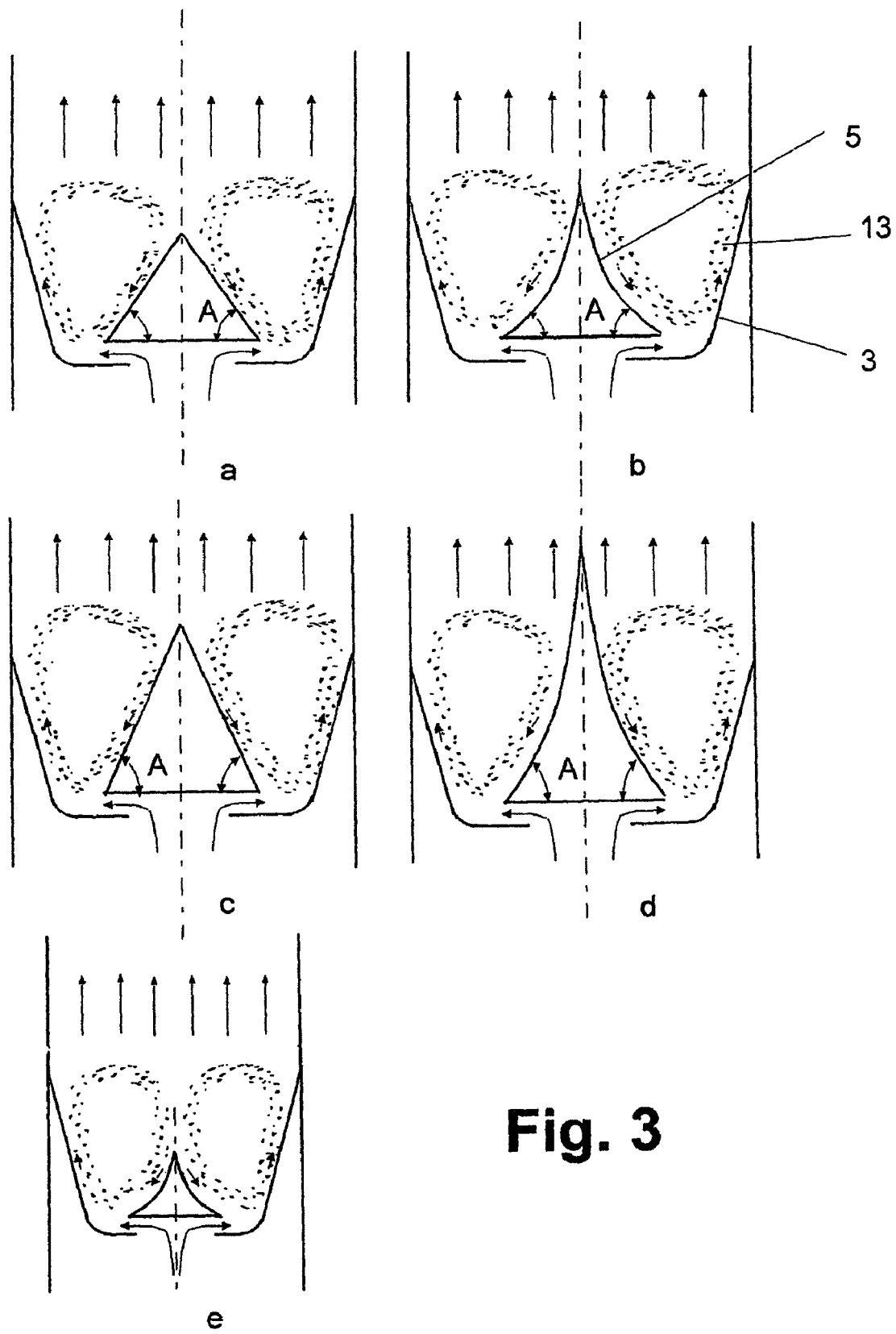

Alternate embodiments of the installation part 5 are shown in FIG. 3.

In FIGS. 3a and 3c the exterior walls of the installation part 5 are embodied straight, with the exterior walls in FIG. 3c extending higher than in FIG. 3a. FIG. 3b shows the exterior walls with a contour curved inwardly. In FIG. 3d the curved exterior walls are extended higher. In FIG. 3e the curved exterior walls are not extended as high and the inclined exterior walls are tracking.

In the method according to the invention a gas or material gas flow 12 is fed to the jet chamber 6 and a material gas flow 15 almost centrally to the jet chamber 8 and deflected in the direction of the exterior side walls 3 of the spouted bed device 1 such a roller-shaped flow 13 develops, positioned in the axial direction of the jet chambers 6 and 8 and aligned upwards at the exterior side walls 3. It has been found that in this flow alignment the abrasive effect of the inert bed, moving in form of a roller upward along the exterior inclined side walls 3, is essentially greater than in a flow alignment from the outside towards the inside. The gas flow in the jet chambers 6 and 8 forms a spouted bed 4, comprising material particles, inert bodies, and moist and dry material particles adhering to the inert bodies. By the upward flow 13 the material particles and the inert particles are rapidly thrown upward along the inclined exterior side wall 3 and along the interior inclined side walls of the installation part 5 according to the arrow direction 14 and returned to the gas flow, and thrown upward once more so that a roller form of the inert particle flow develops. By this roller a rapidly oscillating particle layer can form, if applicable. This particle circulation occurs very rapidly and stably.

The spouted bed 4 in the jet chamber 6 and/or the jet chamber 8 can be supplied with liquids or liquids containing solid matter, such as suspensions, solutions, melts, or slurries via the nozzles 10.

Above the jet chamber 6, material collection occurs by the dust separator 7, in order to prevent the discharge of dust particles considerably too large from the first spouted bed 4 of the jet chamber 6 and in order to return them downwards to the first spouted bed 4. The dust separator 7 is sized such that both the dust particles of the desired dimensions as well as dust particles of slightly lager dimensions are allowed to pass, but no particles being considerably larger. The dust particles being considerably too large fall back into the first spouted bed 4 of the jet chamber 6 and are here further milled and discharged upwards once more.

The material particles that have passed the dust separator 7 together with the gas flow are fed to the jet chamber 8 located thereabove in the form of a material-gas flow 15. A spouted bed 4 is created once more in the jet chamber 8, which is adjusted to the changed conditions, though. The spouted layer 4 is provided with inert bodies, which have e.g., smaller and/or lighter inert particles with rough surfaces and a similar bed mass. In the roller shaped spouted bed 4 of the jet chamber 8 the particles still too large are being milled and then pass, together with the dust particles already showing the target size, through the dust collection device 9, located above the jet chamber 8, which is sized to only allow particles of the target size to pass. Any dust particles still too large fall from the dust separating device 9 back to the jet chamber 8 and are further milled.

The precise temperature adjustment inside the device, if necessary also for the thermal conditioning of the materials, occurs gradually in the jet chambers 6 and 8 according to the invention, primarily by a conventional high-frequency heater 11 at a frequency range from 30 kHz to 300 MHz. The heating devices 11 are arranged in the installation parts 5. The material and the inert bodies in a dense mass move gliding down the exterior side walls at a slow speed such that here particularly beneficial conditions for a good heat transfer are given, on the one hand, by heat conduction from the inductively heated metal surface of the installation parts 5 to the di-electrically heated, moist, coated inert particles, primarily however by way of induction from the high frequency heater 11 directly to the moist coated inert particles.

Particularly beneficial conditions for the use of the high frequency heater 11 are given when the moist product, moist dust, sprayed liquid, or injected slurry, has sufficient ohmic conductivity on the surface of the inert body in order to allow heating by ionic conduction in the electric field. The electric conductivity is sufficiently high if for example dissolved salts are included in an aqueous-moist solid matter. Due to the fact that the electric conductivity in such solid matter itself depends on the moisture content, moister sections are heated more intensely than the areas already dry, greatly benefiting the solution of the given problem. Therefore, these high frequency heaters 11 operate carefully when increasing the temperature or stabilizing, both with regard to the perhaps moist coated side walls of the installation parts 5 as well as primarily the intensely moved and mixed spouted bed when the inert bodies are made from a material suitable to transfer high frequency and are coated with solid material particles to be abraded being more or less moist. This way a rapid, effective, and precise heat transfer to the coated or uncoated inert bodies is ensured and thus to the product to be conditioned.

In order to adjust the temperature at low temperature ranges, instead of the high frequency heater, beginning at the second spouted bed 8 a cooling gas or a cooling liquid can be inserted directly through the installation part 5 embodied hollow.

Furthermore, for the same purpose a cooling gas can be fed to the second spouted bed stage 8 via a gas supply 17.

LIST OF REFERENCE CHARACTERS USED

1 Spouted bed device
2 Opening
3 Side wall
4 Spouted bed
5 Installation part
6 Jet chamber
7 Dust separating device
8 Jet chamber
9 Dust separating device
10 Nozzle inlet
11 Heating device
12 Gas flow
13 Upward directed flow
14 Direction of arrow
15 Material gas flow
16 Channel
17 Cooling gas supply
A Angle

The invention claimed is:

1. A method for at least one of production or conditioning of powdered material in a spouted bed with inert bed particles in which a targeted particle size is achieved by way of abrasion of material particles and the inert bed particles moving along each other in the spouted bed and a final product is deposited at a separator, the method comprising: in a two or multiple stage conditioning of the material, pretreating the powdered material in a first spouted bed (4) and feeding material separated from coarser material particles in an integrated dust separating device (7) together with a gas flow leaving the first spouted bed (4) as a material gas flow (15) to a second spouted bed (4) located thereabove, further milling and conditioning the material in the second spouted bed and, after separating the powdered material from the coarser material particles in an integrated dust separating device (9), discharging a powdered material having very small particle diameters from the two-stage spouted bed conditioning with the gas flow, and returning coarser material particles to the spouted bed (4) of the second jet chamber (8).

2. A method according to claim 1, wherein a gas or a material-gas flow (12) is fed to a first jet chamber (6) and a material-gas flow (15) is fed to a second jet chamber (8), both generally centrally, and are deflected in a direction of exterior side walls (3) of the spouted bed device (1) such that a roller shaped flow (13) develops in an axial direction of the jet chambers (6) and (8) and is directed upward along the exterior side walls (3).

3. A method according to claim 1, wherein the coarser material particles separated in the dust separating device (7) are returned to the spouted bed (4) of the first jet chamber (6).

4. A method according to claim 2, wherein liquids or liquids containing solid-matter are fed to at least one of the first jet chamber (6) or the second jet chamber (8) by a nozzle inlet (10).

5. A method according to claim 2, wherein the spouted bed (4) of the jet chamber (6) and (8) can be heated indirectly and in a controlled fashion for thermally conditioning the material.

6. A method according to claim 4, wherein the liquids fed to at least one of the first jet chamber (6) or the second jet chamber (8) contain salts dissolved in liquids.

7. A method according to claim 2, wherein at least one the inert bed particles or their coatings located in the spouted bed (4) of the jet chambers (6) and (8) comprise a material that can be heated by high-frequency energy.

8. A method according to claim 1, wherein the powdered material discharged from the two-stage spouted bed conditioning is fed to a final separator for separating the final product having a desired target size.

9. A device for at least one of producing or conditioning powdered material, comprising a spouted bed device including a first jet chamber having, in a direction of a gas flow supplied from the bottom, side walls inclined towards an outside thereof and with an upper section being embodied as a separating chamber, a second jet chamber (8) with an integrated dust separating device (9) is arranged above the first jet chamber (6) which also includes an integrated dust separating device (7) and combined they form the spouted bed device (1).

10. A device according to claim 9, wherein the first jet chamber (6) and the second jet chamber are each (8) provided with a generally centrally arranged opening (2) in a lower section, which opens at both sides into a channel (16) aligned in a direction of the side walls (3).

11. A device according to claim 9, wherein at least one of the dust separating devices (7) or (9) arranged above the jet chambers (6) or (8) is a zigzag-sifteror is formed by an expanded cross-section.

12. A device according to claim 9, wherein an installation part (5) is embodied wedge-shaped and is arranged above an opening (2) of the jet chambers (6) and (8), with a lower wall thereof respectively forming a side wall of the channel (16).

13. A device according to claim 12, wherein the spouted bed device (1) has a bilaterally symmetrical rectangular cross-section.

14. A device according to claim 12, wherein the installation part (5) is embodied hollow and a controllable heating device (11) is arranged therein for thermal treatment of the material.

15. A device according to claim 12, wherein the side walls of the wedge-shaped installation part (5) have a straight or inwardly curved contour, with an angle (A) between the side walls thereof and a base area of the installation part (5) ranging from approx. 45° to 60°.

16. A device according to claim 9, wherein nozzle inlets (10) for liquids or liquids containing solid matter are arranged in at least one of the first jet chamber (6) or the second jet chamber (8).

17. A device according to claim 9, wherein the dust separating device (9) of the second jet chamber has a higher separating rate than the dust separating device (7) of the first jet chamber.

18. A device according to claim 9, wherein a separator is arranged downstream in reference to the spouted bed device (1).

* * * * *